(12) United States Patent
Kraynev et al.

(10) Patent No.: US 8,360,923 B2
(45) Date of Patent: Jan. 29, 2013

(54) MULTI-SPEED TRANSMISSION WITH PLANETARY GEAR SETS AND LAYSHAFTS

(75) Inventors: Alexander Filippovich Kraynev, Moscow (RU); Vladimir Konstantinovich Astashev, Moscow (RU); Konstantin Borisovich Salamandra, Moscow (RU); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 143 days.

(21) Appl. No.: 12/954,933

(22) Filed: Nov. 29, 2010

(65) Prior Publication Data
US 2011/0230299 A1    Sep. 22, 2011

(30) Foreign Application Priority Data
Mar. 19, 2010  (RU) .................................. 2010110533

(51) Int. Cl.
*F16H 3/62*    (2006.01)
(52) U.S. Cl. ........................................ 475/277; 475/288
(58) Field of Classification Search ............ 74/329–331; 475/218, 219, 277, 288
See application file for complete search history.

(56) References Cited

U.S. PATENT DOCUMENTS

| | | | |
|---|---|---|---|
| 4,070,927 A | 1/1978 | Polak | |
| 4,709,594 A | 12/1987 | Maeda | |
| 4,727,764 A * | 3/1988 | Klaue | 74/331 |
| 5,106,352 A | 4/1992 | Lepelletier | |
| 5,385,064 A | 1/1995 | Reece | |
| 5,497,867 A | 3/1996 | Hirsch et al. | |
| 5,560,461 A | 10/1996 | Loeffler | |
| 5,599,251 A | 2/1997 | Beim et al. | |

(Continued)

FOREIGN PATENT DOCUMENTS

| | | |
|---|---|---|
| EP | 1375967 A2 | 1/2004 |
| EP | 2110581 A2 | 10/2009 |

(Continued)

OTHER PUBLICATIONS

Masami Kondo, Yoshio Hasegawa, Yoji Takanami, Kenji Arai, Masaharu Tanaka, Masafumi Kinoshita, Takeshi Ootsuki, Tetsuya Yamaguchi, Akira Fukatsu, "Toyota AA80E 8-Speed Automatic Transmission with Novel Powertrain Control System", SAE Technical Paper Series, Apr. 16-19, 2007, 2007-01-1311, Warrendale, PA 15096-0001 USA.

(Continued)

*Primary Examiner* — David D Le
*Assistant Examiner* — Derek D Knight
(74) *Attorney, Agent, or Firm* — Quinn Law Group, PLLC

(57) ABSTRACT

A transmission is provided that includes a first compound planetary gear set and a second planetary gear set. An input member, an output member and the planetary gear sets are arranged coaxially with one another to define a first axis of rotation. A first and a second layshaft are arranged coaxially with one another to define a second axis of rotation. A first set of intermeshing gears transfer torque from the input member to the first layshaft. A second set of intermeshing gears transfer torque from the second layshaft to the second planetary gear set. Seven torque-transmitting mechanisms are engagable in different combinations to establish multiple forward speed ratios and a reverse speed ratio between the input member and the output member.

17 Claims, 1 Drawing Sheet

U.S. PATENT DOCUMENTS

| | | | |
|---|---|---|---|
| 5,641,045 A | 6/1997 | Ogawa et al. | |
| 5,651,435 A | 7/1997 | Perosky et al. | |
| 5,916,053 A * | 6/1999 | McCarrick et al. | 475/211 |
| 5,975,263 A | 11/1999 | Forsyth | |
| 6,053,839 A | 4/2000 | Baldwin et al. | |
| 6,071,208 A | 6/2000 | Koivunen | |
| 6,083,135 A | 7/2000 | Baldwin et al. | |
| 6,217,474 B1 | 4/2001 | Ross et al. | |
| 6,354,416 B1 | 3/2002 | Eo | |
| 6,375,592 B1 | 4/2002 | Takahashi et al. | |
| 6,422,969 B1 | 7/2002 | Raghavan et al. | |
| 6,425,841 B1 | 7/2002 | Haka | |
| 6,471,615 B1 | 10/2002 | Naraki et al. | |
| 6,558,287 B2 | 5/2003 | Hayabuchi et al. | |
| 6,623,397 B1 | 9/2003 | Raghavan et al. | |
| 6,840,885 B2 | 1/2005 | Yi et al. | |
| 7,004,878 B2 * | 2/2006 | Gumpoltsberger et al. | 475/218 |
| 7,695,390 B2 * | 4/2010 | Phillips | 475/218 |
| 8,047,944 B2 * | 11/2011 | Glockler | 475/210 |
| 8,146,451 B2 * | 4/2012 | Van Druten et al. | 74/330 |
| 2006/0014603 A1 | 1/2006 | Raghavan et al. | |
| 2007/0131046 A1 * | 6/2007 | Borgerson | 74/331 |
| 2008/0090691 A1 * | 4/2008 | Van Druten et al. | 475/207 |
| 2009/0205450 A1 * | 8/2009 | Gitt | 74/325 |
| 2010/0167865 A1 * | 7/2010 | Glockler | 475/219 |
| 2011/0212807 A1 * | 9/2011 | Kraynev et al. | 475/296 |

FOREIGN PATENT DOCUMENTS

| | | |
|---|---|---|
| JP | 09-126283 A | 5/1997 |
| RU | 2053138 C1 | 1/1996 |
| RU | 2183295 C2 | 10/2002 |
| WO | 03025431 A1 | 3/2003 |
| WO | 2006032312 A1 | 3/2006 |
| WO | 2006074707 A1 | 7/2006 |

OTHER PUBLICATIONS

Hirofumi Ota, Kazutoshi, Nozaki, Atsushi Honda, Masafumi Kinoshita, Toshihiko Aoki, Minoru Todo, Mikio Iwase, "Toyota's World First 8-Speed Automatic Transmission for Passenger Cars", SAE Technical Paper Series, Apr. 16-19, 2007, 2007-01-1101, Warrendale, PA 15096-0001 USA.

* cited by examiner

| Gear State | Speed Ratio | Ratio Step | C1 | C2 | C3 | C4 | C5 | C6 | C7 |
|---|---|---|---|---|---|---|---|---|---|
| 1st | 10.20 | | | x | | x | | x | |
| 2nd | 7.30 | 1.40 | x | | | x | x | | |
| 3rd | 6.80 | 1.07 | x | | | | x | x | |
| 4th | 6.56 | 1.04 | | x | x | | | | x |
| 5th | 4.86 | 1.35 | x | | | x | x | | |
| 6th | 4.23 | 1.15 | | x | | x | | | x |
| 7th | 3.96 | 1.07 | | x | x | | | x | |
| 8th | 2.98 | 1.33 | | x | | x | | x | |
| 9th | 2.83 | 1.05 | | x | x | | x | | |
| 10th | 2.12 | 1.33 | | x | | x | x | | |
| 11th | 1.63 | 1.30 | x | x | | | | | x |
| 12th | 1.40 | 1.16 | x | x | | | | x | |
| 13th | 1.00 | 1.40 | x | x | | | x | | |
| REV | -10.00 | | | | x | x | | | x | x = Engaged State

MULTI-SPEED TRANSMISSION WITH PLANETARY GEAR SETS AND LAYSHAFTS

CROSS-REFERENCE TO RELATED APPLICATION

This application claims the benefit of Russian Patent Application No. 2010110533, filed Mar. 19, 2010, which is hereby incorporated by reference in its entirety.

TECHNICAL FIELD

The invention relates to a multi-speed planetary transmission with planetary gear sets and layshafts, and having gears establishing five gear planes.

BACKGROUND OF THE INVENTION

Automotive vehicles include a powertrain that is comprised of an engine, a multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising other than the most efficient point. Therefore, manually-shifted (layshaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improved the shift quality of the transmission by making the ratio interchanges substantially imperceptible to the operator under normal vehicle acceleration.

Multi-speed transmissions with greater than four speed ratios provide further improvements in acceleration and fuel economy over three- and four-speed transmissions. However, typical increased complexity, size and cost of such transmissions are competing factors which may prevent their use in some applications.

SUMMARY OF THE INVENTION

A multi-speed transmission that can operate at up to thirteen forward speed ratios is provided that utilizes planetary gear sets and torque transfer using intermeshing gears and layshafts. The transmission includes an input member, an output member, and a stationary member, such as a transmission casing. The transmission further includes a first compound planetary gear set and a second simple planetary gear set. The first planetary gear set has a first, a second, a third, a fourth, and a fifth member. The second planetary gear set has a first, a second, and a third member. In referring to the members of the planetary gear sets in this manner, the members may be counted "first" to "fourth" or "first" to "fifth" in any order (i.e., top to bottom, bottom to top, etc.). The members of the planetary gear sets are sun gear members, ring gear members and carrier members. The input member, the output member and the planetary gear sets are arranged coaxially with one another to define a first axis of rotation. A first and a second layshaft are arranged coaxially with one another to define a second axis of rotation.

A first set of intermeshing gears, also referred to as transfer gears, are arranged to transfer torque from the input member to the first layshaft. A second set of intermeshing gears, also referred to as transfer gears, are arranged to transfer torque from the second layshaft to the second planetary gear set. Seven torque-transmitting mechanisms are each selectively engagable to connect a respective member of the planetary gear sets or a respective one of the layshafts to the stationary member or for common rotation with the input member, with another respective member of the planetary gear sets, or with another respective one of the layshafts. As used herein, "common rotation" means rotation at the same speed (i.e., no relative rotation). The seven torque-transmitting mechanisms are three brakes and four rotating-type clutches, and are engagable in different combinations to establish up to thirteen forward speed ratios and a reverse speed ratio between the input member and the output member. Alternatively, the transmission may be operated with less than thirteen forward speed ratios. Shifts between at least some of the forward speed ratios are single-transition shifts.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
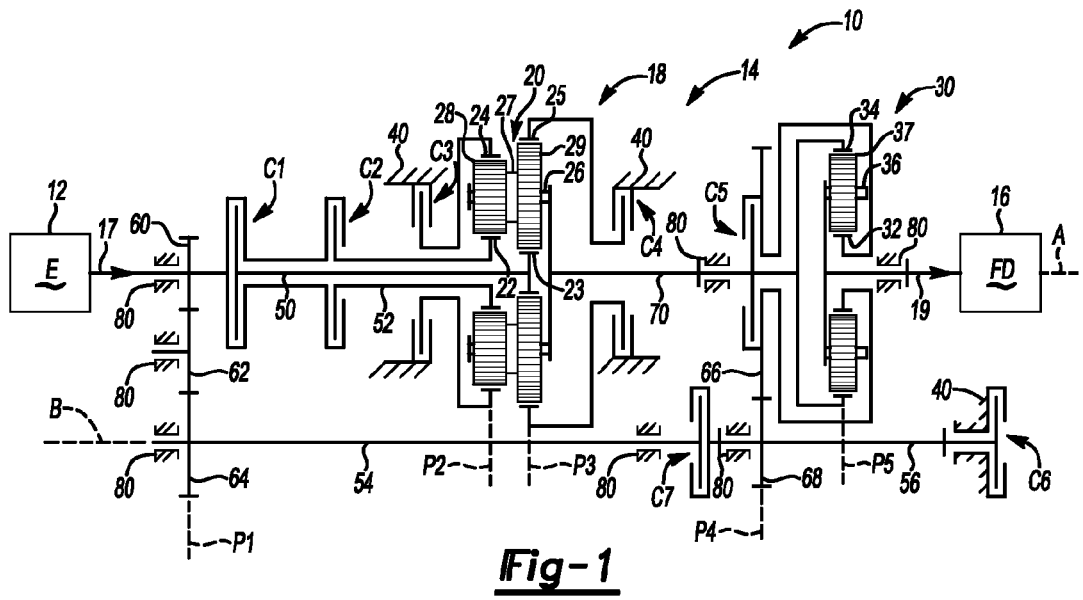
FIG. 1 is a schematic illustration in stick diagram form of a powertrain having a multi-speed transmission.
FIG. 2 is a truth table depicting some of operating characteristics of the transmission shown in FIG. 1.

Referring to the drawings, wherein like reference numbers refer to like components, FIG. 1 shows the powertrain 10 with an engine 12 (labeled E), a combination layshaft and planetary transmission 14, and a final drive mechanism 16 (labeled FD). The engine 12 may be powered by various types of fuel to improve the efficiency and fuel economy of a particular application. Such fuels may include, for example gasoline, diesel, an ethanol, dimethyl ether, etc. The transmission 14 includes an input member 17 continuously connected with an output member of the engine 12, such as a crankshaft, optionally through a torque converter. The transmission 14 further includes a planetary gear arrangement 18, and an output member 19 connected with the final drive mechanism 16 for providing propulsion power to vehicle wheels.

The planetary gear arrangement 18 includes a first compound planetary gear set 20, and a second simple planetary gear set 30. The compound planetary gear set 20 include two sun gear members 22, 23, two ring gear members 24, 25, and a carrier member 26 that rotatably supports a stepped pinion gear 27. The stepped pinion gear 27 has a small diameter portion 28 and a large diameter portion 29. The small diameter portion 28 meshes with sun gear member 22 and ring gear member 24. The large diameter portion 29 meshes with sun gear member 23 and ring gear member 25. The sun gear member 23 is referred to as a first member of the first compound planetary gear set 20. The sun gear member 22 is referred to as the second member of the first compound planetary gear set 20. The ring gear member 24 is referred to as the third member of the first compound planetary gear set 20. The ring gear member 25 is referred to as the fourth member of the compound planetary gear set 20. The carrier member 26 is referred to as the fifth member of the planetary gear set 20.

The simple planetary gear set 30 includes a sun gear member 32, a ring gear member 34, and a carrier member 36 that rotatably supports a set of pinion gears 37. The pinion gears 37 mesh with sun gear member 32 and with the ring gear member 34. The ring gear member 34 is referred to as a first member of the compound planetary gear set 30. The sun gear member 32 is referred to as a second member of the compound planetary gear set 30. The carrier member 36 is referred to as the third member of the compound planetary gear set 30.

The transmission 14 includes multiple shafts arranged to define two different axes of rotation A and B. An intermediate shaft 50 is connected for rotation with the sun gear member 23. An intermediate shaft 52 is connected for rotation with the sun gear member 22, and is a sleeve shaft concentric with intermediate shaft 50. An interconnecting member 70 continuously connects carrier member 26 for rotation with the ring gear member 34. The interconnecting member 70 is another intermediate shaft coaxial with the intermediate shafts 50 and 52, and with input member 17 and output member 19. The shafts 50, 52, interconnecting member 70, input member 17 and output member 19, as well as planetary gear sets 20 and 30 define and are rotatable about a first axis of rotation A. A first layshaft 54 and a second layshaft 56 are arranged coaxially with one another to define a second axis of rotation B that is spaced from and parallel to the first axis of rotation A.

A first set of intermeshing gears 60, 62, and 64 transfer torque from the input member 17 to the layshaft 54. Gear 60 is rigidly connected for common rotation with input member 17 and meshes with gear 62. Gear 62 meshes with gear 64, which is rigidly connected for common rotation with layshaft 54. The input member 70, gear 62, layshafts 54 and 56, interconnecting member 70 and output member 19 are supported for rotation by grounded bearings 80.

A second set of intermeshing gears 66, 68 transfers torque from layshaft 56 to ring gear member 34. Gear 68 is rigidly connected for common rotation with layshaft 56. Gear 66 is rigidly connected for common rotation with ring gear member 34 and is coaxial about interconnecting member 70.

The gears of the planetary gear sets 20, 30 and the first and second sets of intermeshing gears 60, 62, 64, and 66, 68, respectively, establish five planes of different intermeshing gears, referred to herein as gear planes. The first set of intermeshing gears 60, 62, 64 mesh in gear plane P1. The ring gear member 24, small diameter potion 28 of pinion gears 27 and sun gear member 22 mesh in gear plane P2. The ring gear member 25, large diameter portion 29 of pinion gears 27 and sun gear member 23 mesh in gear plane P3. The second set of intermeshing gears 66, 68 mesh in gear plane P4. The ring gear member 34, pinion gears 37 and sun gear member 32 mesh in gear plane P5. The gear planes P1-P5 extend perpendicular to the drawing sheet in FIG. 1.

The transmission 14 further includes seven torque-transmitting mechanisms: a first torque-transmitting mechanism C1, a second torque-transmitting mechanism C2, a third torque-transmitting mechanism C3, a fourth torque-transmitting mechanism C4, a fifth torque-transmitting mechanism C5, a sixth torque-transmitting mechanism C6, and a seventh torque-transmitting mechanism C7. Torque-transmitting mechanisms C1, C2, C5 and C7 are rotating-type clutches. Torque-transmitting mechanisms C3, C4, and C6 are stationary-type clutches, also referred to as brakes.

As is apparent in FIG. 1, the output member 19 is continuously connected for common rotation with carrier member 36. Carrier member 26 is continuously connected for common rotation with ring gear member 34 via interconnecting member 70.

The first torque-transmitting mechanism C1, also referred to as clutch C1, is a rotating-type clutch selectively engagable to connect the input member 17 for common rotation with the sun gear member 23 via intermediate shaft 50. The second torque-transmitting mechanism C2, also referred to as clutch C2, is a rotating-type clutch selectively engagable to connect the input member 17 for common rotation with the sun gear member 22 via intermediate shaft 52. The third torque-transmitting mechanism C3, also referred to as brake C3, is a stationary-type clutch selectively engagable to ground the ring gear member 24 to the stationary member 40. The fourth torque-transmitting mechanism C4, also referred to as brake C4, is a stationary-type clutch selectively engagable to ground ring gear member 25 to the stationary member 40. The fifth torque-transmitting mechanism C5, also referred to as clutch C5, is a rotating-type clutch selectively engagable to connect the carrier member 26 for common rotation with the sun gear member 32 via the interconnecting member 70. The sixth torque-transmitting mechanism C6, also referred to as brake C6, is a stationary-type clutch selectively engagable to ground layshaft 56 to the stationary member 40. The seventh torque-transmitting mechanism C7, also referred to as clutch C7, is a selectively engagable to connect layshaft 54 for common rotation with layshaft 56. The position of clutch C7 between the coaxial layshafts 52 and 54 allows the use of a dog clutch for clutch C7. Alternatively, a plate clutch could be used. Different ones of the clutches may be friction clutches, synchronizers, band clutches, a selectively engagable one-way clutch, a dog clutch, or other types of clutches.

As shown in the truth table of FIG. 2, the torque-transmitting mechanisms C1, C2, C3, C4, C5, C6 and C7 are selectively engagable in combinations of three to provide thirteen forward speed ratios and a reverse speed ratio (listed as gear states). Numerical gear ratios corresponding with the speed ratios are listed in FIG. 2. The gear ratio is the ratio of the torque of the output member 19 to the torque of the input member 17.

The numerical gear ratios set forth in FIG. 2 result from the tooth counts establishing the following gear ratios for the first compound planetary gear set 20: the gear ratio of the ring gear member 24 to the sun gear member 22 is −1.83 assuming the carrier member 26 is stopped (for purposes of calculation only); the gear ratio of the ring gear member 25 to the sun gear member 23 is −3.87 assuming the carrier member 26 is stopped (for purposes of calculation only). The tooth counts for the second planetary gear set 30 are selected so that the gear ratio of the ring gear member 34 to the sun gear member 32 is −2.5, assuming the carrier member 36 is stopped (for purposes of calculation only). The gear ratio from the input member 17 to the first countershaft 54 is −2.86.

With the tooth counts listed above, there are twelve underdrive speed ratios (1st to 12th), and a direct drive (13th) that result in the ratio steps listed in FIG. 2. As is apparent in FIG. 2, the ratio steps are relatively even in the forward speed ratios, resulting in smooth shift feel and increased fuel efficiency as the engine 12 need only operate over a narrow range of speeds in each speed ratio.

Other gear tooth counts and corresponding gear ratios may be selected to accomplish speed ratios and ratio steps advantageous to the particular transmission application. A person of ordinary skill in the art of transmission design would understand how to select desirable tooth counts.

To establish the reverse speed ratio, clutch C7 and brakes C3 and C4 are engaged. Because clutch C7 is engaged, torque is carried from the input member 17 through the set of intermeshing gears 60, 62, 64 to layshafts 54 and 56. Because brakes C3 and C4 are engaged, none of the members of the planetary gear set 20 rotate, so carrier member 26, interconnecting member 70 and ring gear member 34 do not rotate. Thus, torque is provided from layshaft 56 through the set of intermeshing gears 68, 66, through planetary gear set 30 to output member 19. The output member 19 rotates in an opposite direction from the input member 17.

To establish the first speed ratio, clutch C1, and brakes C3 and C6 are engaged. Torque is carried from the input member 17 through sun gear member 23 to carrier member 26, and to ring gear member 34 through planetary gear set 30 to output member 19, with sun gear member 32 held stationary due to engagement of clutch C6. Input member 17 and output member 19 rotate in the same direction, as in all of the forward speed ratios.

In the second forward speed ratio, clutches C1 and C5 and brake C3 are engaged. Torque is carried from the input member 17 through sun gear member 23 to carrier member 26, and to ring gear member 34 through planetary gear set 30 to output member 19. Because clutch C5 is engaged, torque is also carried from carrier member 26 to sun gear member 32. Thus, all components of planetary gear set 30 rotate at the same speed, and the planetary gear set 30 is inactive. The shift from the first forward speed ratio to the second forward speed ratio is a single-transition shift, in that only one different torque-transmitting mechanism is engaged in the second forward speed ratio than in the first forward speed ratio.

In a third forward speed ratio, clutch C1 and brakes C4 and C6 are engaged. Torque is carried from the input member 17 through sun gear member 23 to carrier member 26, and to ring gear member 34 through planetary gear set 30 to output member 19, with sun gear member 32 held stationary. The shift from the second forward speed ratio to the third forward speed ratio is a double-transition shift, in that two different torque-transmitting mechanisms are engaged in the third forward speed ratio than in the second forward speed ratio.

In a fourth forward speed ratio, brake C3 and clutches C2 and C7 are engaged. Torque is carried from the input member 17 through sun gear member 22 to carrier member 26, to the ring gear member 34. Torque is also carried through the set of intermeshing gears 60, 62, 64, layshafts 54 and 56, and set of intermeshing gears 66, 68 to sun gear member 32. Torque at sun gear member 32 and ring gear member 34 is combined through planetary gear set 30 to output member 19. The shift from the third forward speed ratio to the fourth forward speed ratio is a double-transition shift.

In a fifth forward speed ratio, brake C4 and clutches C1 and C5 are engaged. Torque is carried from the input member 17 through sun gear member 23 to carrier member 26, and to both sun gear member 32 and ring gear member 34, through planetary gear set 30 to output member 19. Because the ring gear member 34 rotates at the same speed as the sun gear member 32 when clutch C5 is engaged, the planetary gear set 30 is inactive. The shift from the fourth forward speed ratio to the fifth forward speed ratio is a triple-transition shift.

In a sixth forward speed ratio, clutches C2 and C7 and brake C4 are engaged. Torque is carried from the input member 17 through sun gear member 22 to carrier member 26, and to ring gear member 34. Torque is also carried through the set of intermeshing gears 60, 62, 64, layshafts 54 and 56, and set of intermeshing gears 66, 68 to sun gear member 32. Torque at sun gear member 32 and ring gear member 34 is combined through planetary gear set 30 to output member 19. The shift from the fifth forward speed ratio to the sixth forward speed ratio is a double-transition shift.

In a seventh forward speed ratio, clutch C2 and brakes C3 and C6 are engaged. Torque is carried from the input member 17 to the sun gear member 22 through the first compound planetary gear set 20, to the ring gear member 34 through planetary gear set 30 to output member 19, with sun gear member 32 held stationary by engagement of brake C6. The shift from the sixth forward speed ratio to the seventh forward speed ratio is a double-transition shift.

In an eighth forward speed ratio, clutch C2 and brakes C4 and C6 are engaged. Torque is carried from the input member 17 through sun gear member 22 to carrier member 26, and to ring gear member 34 through planetary gear set 30 to output member 19, with sun gear member 32 held stationary by engagement of brake C6. The shift from the seventh forward speed ratio to the eighth forward speed ratio is a single-transition shift.

In a ninth forward speed ratio, brake C3 and clutches C2 and C5 are engaged. Torque is carried from the input member 17 through sun gear member 22 to carrier member 26, and to both sun gear member 32 and ring gear member 34, through planetary gear set 30 to output member 19. Because the ring gear member 34 rotates at the same speed as the sun gear member 32 when clutch C5 is engaged, the planetary gear set 30 is inactive. The shift from the eighth forward speed ratio to the ninth forward speed ratio is a double-transition shift.

In a tenth forward speed ratio, brake C4 and clutches C2 and C5 are engaged. Torque is carried from the input member 17 through sun gear member 22 to carrier member 26, and to both sun gear member 32 and ring gear member 34, through planetary gear set 30 to output member 19. Because the ring gear member 34 rotates at the same speed as the sun gear member 32 when clutch C5 is engaged, the planetary gear set 30 is inactive. The shift from the ninth forward speed ratio to the tenth forward speed ratio is a single-transition shift.

In an eleventh forward speed ratio, clutches C1, C2 and C7 are engaged. Torque is carried from the input member 17 to both sun gear members 22 and 23 to carrier member 26. Because both sun gear members 22 and 23 rotate at the same speed, planetary gear set 20 is inactive. Accordingly, carrier member 26 and ring gear member 34 rotate at the speed of the input member 17. Torque is also carried through the set of intermeshing gears 60, 62, 64, layshafts 54 and 56, and set of intermeshing gears 66, 68 to sun gear member 32. Torque at sun gear member 32 and ring gear member 34 is combined through planetary gear set 30 to output member 19. The shift from the tenth forward speed ratio to the eleventh forward speed ratio is a double-transition shift.

In a twelfth forward speed ratio, clutches C1, C2 and brake C6 are engaged. Torque is carried from the input member 17 to both sun gear members 22 and 23 to carrier member 26. Because both sun gear members 22 and 23 rotate at the same speed, planetary gear set 20 is inactive. Accordingly, carrier member 26 and ring gear member 34 rotate at the speed of the input member 17. Sun gear member 32 is held stationary by engagement of brake C6. Torque at ring gear member 34 is provided to output member 19 through planetary gear set 30. The shift from the eleventh forward speed ratio to the twelfth forward speed ratio is a single-transition shift.

In a thirteenth forward speed ratio, clutches C1, C2 and C5 are engaged. Torque is carried from the input member 17 to both sun gear members 22 and 23, and through planetary gear set 20 to carrier member 26. Because both sun gear members 22 and 23 rotate at the same speed, planetary gear set 20 is inactive. Accordingly, carrier member 26 and ring gear member 34 rotate at the speed of the input member 17. Because clutch C5 is engaged, ring gear member 34 rotates at the same speed as sun gear member 32, and planetary gear set 30 is inactive. Accordingly, the speed of the output member 19 is the same as the speed of the input member 17, and a direct drive speed ratio is achieved. The shift from the twelfth forward speed ratio to the thirteenth forward speed ratio is a single-transition shift.

Although thirteen forward speed ratios are available, the transmission 14 may be controlled to operate with only some of the available forward speed ratios. For example, the transmission 14 may be configured to operate as a six-speed transmission, a seven-speed transmission, an eight-speed transmission, a nine-speed transmission, a ten-speed transmission, an eleven speed transmission or a twelve speed transmission. The transmission 14 could also be operated with less than six forward speed ratios.

In one manner of operating the transmission 14 as a six-speed transmission, an algorithm stored in a controller that controls valves that direct hydraulic fluid flow to the torque-transmitting mechanisms may establish only the reverse speed ratio, and the fourth, seventh, ninth, tenth, twelfth and thirteenth forward speed ratios described above as first, second, third, fourth, fifth, and sixth forward speed ratios. In such a six-speed transmission, there would be only one double-transition shift between the fourth and fifth forward speed ratios (i.e., from the tenth to the twelfth forward speed ratios of FIG. 2).

To operate the transmission 14 as a seven-speed transmission, the fourth, sixth, eighth, tenth, eleventh, twelfth, and thirteenth forward speed ratios of FIG. 2 could be utilized. The seven-speed transmission would have only one double-transition shift (from the tenth to the eleventh forward speed ratio of FIG. 2, which would be the fourth to the fifth forward speed ratio of the seven-speed transmission).

To operate the transmission 14 as an eight-speed transmission, the seven forward speed ratios described for the seven-speed transmission could be utilized, as well as the ninth forward speed ratio of FIG. 2. The eight-speed transmission would have two double-transition shifts (from the sixth to the eighth forward speed ratio of FIG. 2, and from the tenth to the eleventh forward speed ratio of FIG. 2, which would be from the second to the third and from the fifth to the sixth forward speed ratios of the eight-speed transmission).

To operate the transmission 14 as a nine-speed transmission, all of the forward speed ratios shown in FIG. 2 would be utilized except for the first, second, third and fifth forward speed ratios. The nine-speed transmission would have three double-transition shifts (from the sixth to the seventh, the eighth to the ninth, and the tenth to the eleventh forward speed ratios of FIG. 2, which would be from the second to the third, the fourth to the fifth, and the sixth to the seventh forward speed ratios of the nine-speed transmission). To operate the transmission as a ten-speed, an eleven-speed, or a twelve-speed transmission, different combinations of the thirteen forward speed ratios of FIG. 2 would be selected to provide the desired number of speed ratios. The forward speed ratios would be selected to minimize the number of double and triple transition shifts, while maintaining desirable ratio steps.

It is evident in FIG. 1 that clutches C1 and C2 and brake C3 are located axially adjacent one another with no other clutches or brakes and no members of the planetary gear sets 20, 30 between the clutches C1, C2 and brake C3. Locating clutches C1, C2 and brake C3 adjacent one another in this manner enables hydraulic fluid flow to the clutches C1, C2 and brake C3 to be through mostly common feed channels. Simplifying the hydraulic feed channels and reducing the overall length of the feed channels simplifies production of the transmission 14 and may enable a smaller pump for the hydraulic system.

In the speed ratios described above in which brake C6 is engaged, torque flows through planetary gear set 20 and planetary gear set 30, with both planetary gear sets 20, 30 affecting the speed ratio between the input member 17 and the output member 19. In the speed ratios described above in which clutch C5 is engaged, planetary gear set 30 is inactive, so only the gear ratio through planetary gear set 20 affects the speed ratio between the input member 17 and the output member 19. In the forward speed ratios described above in which clutch C7 is engaged, the speed of the sun gear member 32 supplied through intermeshing gears 66, 68 is subtracted from the speed supplied to the planetary gear set 20 to the ring gear member 34

The powertrain 10 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
    an input member;
    an output member;
    a stationary member;
    a first compound planetary gear set and a second simple planetary gear set;
wherein the input member, the output member and the planetary gear sets are arranged coaxially with one another to define a first axis of rotation;
    a first and a second layshaft arranged coaxially with one another to define a second axis of rotation;
    a first set of intermeshing gears arranged to transfer torque from the input member to the first layshaft;
    a second set of intermeshing gears arranged to transfer torque from the second layshaft to the second planetary gear set; and
    seven torque-transmitting mechanisms each selectively engagable to connect a respective member of the planetary gear sets or a respective one of the layshafts to the stationary member or for common rotation with the input member, with another respective member of the planetary gear sets or with another respective one of the layshafts; the seven torque-transmitting mechanisms being engagable in different combinations to establish multiple forward speed ratios and a reverse speed ratio between the input member and the output member.

2. The multi-speed transmission of claim 1, wherein the first compound planetary gear set has a first, a second, a third, a fourth, and a fifth member; wherein the second planetary gear set has a first, a second, and a third member; wherein the members of the planetary gear sets are sun gear members, ring gear members and carrier members; wherein the first and the second members of the first compound planetary gear set are selectively connected for common rotation with the input member via engagement of a first and a second of the seven torque-transmitting mechanisms, respectively.

3. The multi-speed transmission of claim 2, wherein the first and the second torque-transmitting mechanisms are located axially adjacent one another.

4. The multi-speed transmission of claim 1, wherein the first compound planetary gear set has a first, a second, a third, a fourth, and a fifth member; wherein the second planetary gear set has a first, a second, and a third member; wherein the members of the planetary gear sets are sun gear members, ring gear members and carrier members; and wherein the third and fourth members of the first compound planetary gear set are selectively grounded to the stationary member via engagement of a third and a fourth of the seven torque-transmitting mechanisms, respectively.

5. The multi-speed transmission of claim 1, wherein the first compound planetary gear set has a first, a second, a third, a fourth, and a fifth member; wherein the second planetary gear set has a first, a second, and a third member; wherein the members of the planetary gear sets are sun gear members, ring gear members and carrier members; and wherein the fifth member of the first compound planetary gear set is continuously connected for common rotation with the first member of the second compound planetary gear set via an interconnecting member.

6. The multi-speed transmission of claim 5, wherein a fifth of the seven torque-transmitting mechanisms is selectively engagable to connect the first member of the second compound planetary gear set for common rotation with the second member of the second compound planetary gear set.

7. The multi-speed transmission of claim 1, wherein the second set of intermeshing gears transfers torque from the second layshaft to a sun gear member of the second planetary gear set; and wherein a sixth of the seven torque-transmitting mechanisms is selectively engagable to ground the second layshaft to the stationary member, thereby grounding the sun gear member of the second planetary gear set.

8. The multi-speed transmission of claim 1, wherein the second set of intermeshing gears transfers torque from the second layshaft to a sun gear member of the second planetary gear set; and wherein a seventh of the seven torque-transmitting mechanisms is selectively engagable to connect the first layshaft for common rotation with the second layshaft, thereby transferring torque from the input member to the sun gear member of the second planetary gear set via the first and second sets of intermeshing gears and the first and second layshafts.

9. The multi-speed transmission of claim 8, wherein the seventh torque-transmitting mechanism is a dog clutch.

10. The multi-speed transmission of claim 1, wherein the first planetary gear set has a first, a second, a third, a fourth, and a fifth member; wherein the second planetary gear set has a first, a second, and a third member; wherein the members of the planetary gear sets are sun gear members, ring gear members and carrier members;
wherein the first member of the first compound planetary gear set is selectively connected for common rotation with the input member by engagement of the first torque-transmitting mechanism; wherein the second member of the first compound planetary gear set is selectively connected for common rotation with the input member by engagement of the second torque-transmitting mechanism; wherein the third member of the first compound planetary gear set is selectively grounded to the stationary member by engagement of the third torque-transmitting mechanism; wherein the fourth member of the first compound planetary gear set is selectively grounded to the stationary member by engagement of the fourth torque-transmitting mechanism; and further comprising:
an interconnecting member continuously connecting the fifth member of the first compound planetary gear set for common rotation with a member of the second planetary gear set.

11. The multi-speed transmission of claim 1, wherein the first compound planetary gear set has two sun gear members, two ring gears members, and a carrier member that rotatably supports a stepped pinion having a first portion with a first diameter and a second portion with a second diameter larger than the first diameter; wherein the first portion meshes with one of the two sun gear members and one of the two ring gear members and wherein the second portion meshes with the other of the two sun gear members and the other of the two ring gear members.

12. The multi-speed transmission of claim 1, wherein shifts between at least some of the forward speed ratios are single-transition shifts.

13. The multi-speed transmission of claim 1, wherein gears of the sets of intermeshing gears and members of the planetary gear sets mesh in five different planes, respectively.

14. The multi-speed transmission of claim 1, wherein the seven torque-transmitting mechanisms are engagable in different combinations of three to establish up to thirteen forward speed ratios and a reverse speed ratio between the input member and the output member.

15. A multi-speed transmission comprising:
an input member;
an output member;
a stationary member;
a first compound planetary gear set and a second simple planetary gear set;
wherein the input member, the output member and the planetary gear sets are arranged coaxially to define a first axis of rotation; wherein the first compound planetary gear set has two sun gear members, two ring gears members, and a carrier member that rotatably supports a stepped pinion having a first portion with a first diameter and a second portion with a second diameter larger than the first diameter; wherein the first portion meshes with one of the two sun gear members and one of the two ring gear members and wherein the second portion meshes with the other of the two sun gear members and the other of the two ring gear members;
a first and a second layshaft arranged coaxially with one another to define a second axis of rotation;
an interconnecting member continuously connecting the carrier member of the first compound planetary gear set for common rotation with a member of the second planetary gear set;
a first set of intermeshing gears arranged to transfer torque from the input member to the first layshaft;
a second set of intermeshing gears arranged to transfer torque from the second layshaft to the second planetary gear set; and seven torque-transmitting mechanisms each selectively engagable to connect a respective one of the members of the first compound planetary gear set with the stationary member, for common rotation with the input member or with a respective member of the second compound planetary gear set, or to interconnect the second layshaft with the stationary member or for common rotation with the first layshaft; the seven torque-transmitting mechanisms being engagable in different combinations of three to establish up to thirteen forward speed ratios and a reverse speed ratio between the input member and the output member.

16. The multi-speed transmission of claim 15, wherein shifts between at least some of the forward speed ratios are single-transition shifts.

17. The multi-speed transmission of claim 15, wherein three of the torque-transmitting mechanisms are located axially adjacent one another with none of the planetary gear set members and no other of the seven torque-transmitting mechanisms there between.

* * * * *